United States Patent [19]

Pelton

[11] Patent Number: 5,120,027
[45] Date of Patent: Jun. 9, 1992

[54] HEATER ARRANGEMENT FOR ALUMINUM REFINING SYSTEMS

[75] Inventor: John F. Pelton, Yorktown Heights, N.Y.

[73] Assignee: Union Carbide Industrial Gases Technology Corporation, Danbury, Conn.

[21] Appl. No.: 691,830

[22] Filed: Apr. 26, 1991

[51] Int. Cl.[5] ............................................. C22B 4/08
[52] U.S. Cl. ..................................... 266/200; 266/242; 266/900
[58] Field of Search ............... 266/200, 235, 242, 285, 266/900

[56] References Cited

U.S. PATENT DOCUMENTS 4,203,581  5/1980  Pelton ................................. 266/235
4,717,126  1/1988  Pelton ................................. 266/200

Primary Examiner—Scott Kastler
Attorney, Agent, or Firm—Alvin H. Fritschler

[57] ABSTRACT

A support plate, together with the shell of an aluminum holding and/or refining vessel, in combination with a refractory sheet positioned on the inner wall of a graphite block in which a heating element assembly is positioned, is used to hold and seal the heating assembly against exposure to air, without the need for enclosing the heating elements in a metal heating element container.

14 Claims, 3 Drawing Sheets

HEATER ARRANGEMENT FOR ALUMINUM REFINING SYSTEMS

BACKGROUND OF THE INVENTION

1. Field of the Invention

This invention relates to apparatus for the holding and refining of molten aluminum. More particularly, it relates to the protection of heating elements used in such apparatus.

2. Description of the Prior Art

In the refining of aluminum, the use of externally heated, refractory lined cast iron tubs as the refining vessels has been found to be disadvantaged by the limited and somewhat unpredictable life of said tubs. This undesired condition results from the failure of the cast iron tubs because of cracking, bulging, chloride corrosion or wash-out. In addition, design constraints pertaining to such cast iron tubs result in the use of configurations that are difficult to clean, creating a further practical disadvantage to their use in commercial operations.

In an effort to overcome such disadvantages, a refining system was devised consisting of a refractory lined vessel having vertical tubular immersion heaters, such as silicon carbide tubes with internal helical resistance heating elements, suspended from the refining vessel cover. In this case, the heaters were found to have a limited life and, in practice, were very hard to replace. When a heater failed because of the breakage of the silicon carbide tube, pieces of the broken tube would frequently cause breakage of the spinning nozzle used to inject gas into the molten aluminum within the vessel. In addition, such a system was very difficult to clean because of the many recesses between adjacent heater tubes, and between the heater tubes and the vessel walls, where dross would accumulate and be difficult to remove in a convenient manner.

As a result of such problems, an improved apparatus was developed for the refining of aluminum or other molten metals. This apparatus comprised an all-refractory system in which two opposite side walls each consisted of a graphite block having electrical heating elements positioned in vertical holes provided in the graphite blocks, said holes being open at the top and closed at the bottom thereof. Various other features of this system are disclosed in the Szekely patent, U.S. Pat. No. 4,040,610. This system thus provided an internal heating source while overcoming the drawbacks associated with the use of the immersion heater. It was found to increase heater life, minimize erosion and facilitate repair of the system. For the holding of aluminum in the molten state, such a system comprised a vessel adapted for the holding of aluminum in a molten state and including an insulated shell impervious to molten metal, a lining comprising graphite blocks for a portion of the interior of the shell that is intended to be below the surface of melt, and at least one heating means disposed within one or more of the blocks. For application in the refining of aluminum, the system also included at least one rotating gas distributing means disposed in the vessel, as well as inlet and outlet means for molten metal and for gases.

Refractory systems using such graphite heater blocks have been found to constitute a desirable improvement in the art and have been employed to advantage in commercial aluminum refining operations. Nevertheless, further improvements in such systems are desirable to enhance their suitability by the overcoming of practical operating problems encountered in commercial operations. The main problem thus encountered relates to the relatively short life of the heaters under commonly employed operating conditions. One mode of such failure results from oxidation of the graphite heater block, usually from the top portion thereof. Upon oxidation of the block from the top portion and then downward to below the operating metal level in the refining or holding vessel, molten aluminum is able to flow through the oxidized block into the heater cavity, thereby shorting out the electrical heating element positioned therein. Furthermore, where chlorine is employed in the process gas employed, liquid chlorides formed in the molten aluminum may pass through the graphite block and accumulate in the bottom of the heater cavity, leading to the shorting out of said electrical heating element positioned therein. In addition, corrosion of the heaters and heater connections is found to occur as a result of the passage of liquid or vapor state chlorides, that are generated during the refining of aluminum, from the refining chamber, through the interconnected porosity of the graphite block, and into the heater zone in said graphite block. The overcoming of such causes of the relatively short life of the heaters constitutes a significant advance in the development of aluminum holding and refining vessels.

One suitable approach for overcoming such short heater life is disclosed in the Pelton patent, U.S. Pat. No. 4,717,126. The refractory system heater arrangement shown therein is a combination of elements that are designed to (1) protect the graphite heater block from oxidation, and (2) protect the heating element positioned in the block from the attack of chlorides. In the zone of the heater, this dual function is performed by the use of metal heating element container 12, referred to herein as a heater can. In the approach of the Pelton patent, this heater can is sealed to support plate 9. The heating element positioned in the heater can is exposed to air, which is free to enter the interior of the heater can. In this arrangement, the heater can acts as a double barrier to (1) prevent air from the heating zone within the heater can from reacting and oxidizing the surrounding graphite block, and (2) prevent chlorine and chlorides that penetrate the graphite block from contacting and corroding the heating element therein.

While the heater arrangement disclosed in the Pelton patent can be used successfully to prevent oxidation of the graphite block and the attack of chlorides on the heating element positioned therein, there is, of course, a continuing need and desire in the art for further improvement in the aluminum refining art. More specifically, there is such a need and desire for simplification, reduced costs and improved performance of aluminum holding and refining systems. With respect to all-refractory systems and to the protection of heating elements therein, the heater cans represent an expensive additional element of the system. In addition, the use of such heater cans, however useful for the intended purpose, tends to limit the heating power that can be usefully installed in the graphite block.

It is an object of the invention, therefore, to provide an improved electrically heated apparatus for the holding and refining of aluminum.

It is another object of the invention to provide a simplified arrangement for the positioning of heating elements within graphite heater blocks of aluminum holding and refining vessels.

It is a further object of the invention to provide an aluminum holding and refining vessel in which the graphite block in which the electrical heating element is positioned is protected from oxidation and said heating element is protected from chloride attack without the need for employing metal heating element cans.

With these and other objects in mind, the invention is hereinafter described in detail, the novel features thereof being particularly pointed out in the appended claims.

SUMMARY OF THE INVENTION

The heating element assembly itself is sealed to the cover that is over the graphite block in which the heating elements are positioned.

A refractory sheet is positioned on the inner surface of the graphite block above the level of aluminum melt within the vessel. By such interrelated combination of elements, the oxidation of the graphite block and the attack of chlorides on the heating elements can be effectively prevented.

BRIEF DESCRIPTION OF THE DRAWINGS

The invention is hereinafter described in detail with reference to the corresponding drawings in which.

DETAILED DESCRIPTION OF THE INVENTION

Figure 1:
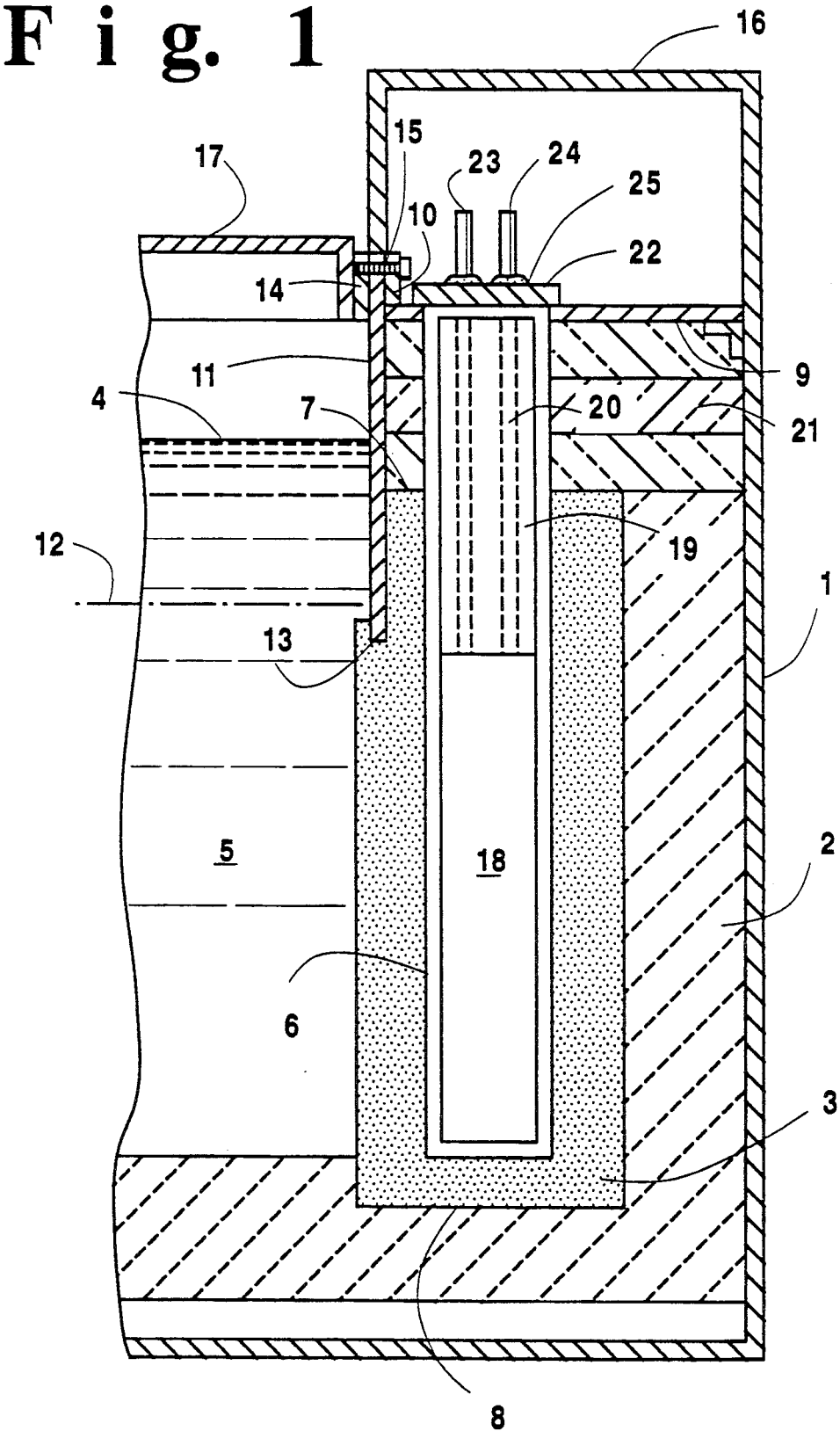
FIG. 1 is a schematic diagram of a cross section of the subject apparatus of the invention.

The objects of the invention are accomplished by the recited interrelated combination of elements serving to protect the graphite heater block from oxidation and the heating elements positioned within the graphite block from chloride attack without the use of the metal heating element cans provided for in the Pelton patent, U.S. Pat. No. 4,717,126, referred to above. The invention resides in the sealing of the heater assembly tightly in relation to a support plate which is attached to the insulated shell of the molten aluminum holding and refining vessel and extending inwardly into the vessel over the graphite block in which the heater assembly is positioned in an opening therein. Thus, air is prevented from entering the opening in the graphite block at this point.

The heating element wires commonly employed in the heater assembly are Nichrome V TM metal, an alloy of 80% by wt. nickel and 20% chromium. When such conductive heating element wires are positioned in an air atmosphere and are exposed to chloride vapors, severe corrosion of the wires usually occurs. It has been found that very rapid oxidation of the metal occurs due to the action of the chlorides in destroying the normally protective nature of the oxide film that exists on the surface of the wire. When no oxygen is present, of course, no oxidation of the heating element wires can occur. Pure chlorine would, of course, be capable of attacking the wires to form volatile metal chlorides. In the aluminum refining application, however, it has been found that, in the operation of the apparatus of the invention, pure chlorine does not enter the heater opening in the graphite block since the chlorine used in refining rapidly reacts within the refining zone to form metal chlorides. Such chlorides will not generally attack the heating element material in the absence of oxygen.

It will be appreciated that the invention relates to a vessel for the holding of molten aluminum, with or without the refining of said aluminum, with the vessel having an insulated shell having a bottom and side walls impervious to molten aluminum, and incorporating a graphite block lining on at least one interior side wall of the shell. The graphite block extends above the design operating melt level within the vessel and is positioned so as to come into contact with the molten aluminum within the vessel. The block has an opening therein extending from the upper end thereof in the direction of, but not reaching, the bottom of the block. An electrical heating element, i.e., an electric resistance heating element, is disposed within the opening in the graphite block, with the heating element being supported in said opening without electrical contact with the graphite block. It is such a vessel and structure that, in the prior practice discussed above, is generally satisfactory except for the relatively short life of the heaters under operating conditions encountered in commercial practice, in the absence of the combination of elements, including the use of heater cans, as described in the above-indicated Pelton patent.

With reference to the drawings, FIG. 1 illustrates a combination of elements employed, without the necessity for a heater can, to enhance heater life and providing an interrelated protection of the heating element from chloride attack in the presence of air, and the protection of the graphite block from oxidation. The furnace shell is represented by the numeral 1, with refractory insulation 2 affixed in the bottom and side walls thereof, said insulation being impervious to molten aluminum. On at least one side wall of the thus-insulated shell, graphite block 3 is positioned to extend above design operating melt level 4 within the vessel. Graphite block 3 is positioned so as to come into contact with the body of aluminum 5 maintained within the vessel during holding or refining operations. Graphite block 3 has an opening therein that extends from the upper end 7 of the block in the direction of, but not reaching, bottom 8 of said block.

In the practice of the invention, a support plate means 9 is attached and sealed to shell 1 and extends inwardly into the vessel at a position above upper end 7 of graphite block 3. In the embodiment shown in the drawing, support plate 9 has flanged position 10 at the innermost end thereof to facilitate the combination of said support plate 9 with other elements of the invention.

The invention includes refractory sheet 11 positioned on the inner surface of graphite block 3. The refractory sheet extends vertically so as to protect graphite block 3 from contact with oxygen in the gas phase above the level of molten aluminum 5 within the vessel. For this purpose, the lower end of refractory sheet 11 extends not only below the design operating molten aluminum level 4, but further to below the design idle level 12 within the vessel. The lower and of refractory sheet 11 is shown as conveniently positioned within notch 13 in graphite block 3. It will be understood that said refractory sheet 11 extends horizontally substantially to both sides of shell 1 for purposes of totally protecting graphite block 3.

At its upper end, refractory sheet 11 is shown positioned between, and secured to, flange position 10 of support plate and plate 14 that constitutes a part of overall shell 1 of the vessel. Bolt means 15 are conveniently employed for purposes of securing refractory sheet 11 to support plate 9 and the vessel shell.

In a convenient embodiment of the invention, the vessel cover comprises an electrical cover 16 and a separate cover 17 over body of molten aluminum 5 in the vessel. Electrical cover 16 is shown as conveniently connected to flange portion 10 of support plate 9 and to shell 1. Cover 17 is shown as connected and sealed to shell plate 14. Those skilled in the art will appreciate that cover 17 can also serve as a support for conventional gas distribution means, not shown, used for the introduction of gas into the molten aluminum during refining operations.

The heating portion of the heating element assembly is represented by the numerical 18 and is shown positioned within opening 6 in graphite block 3 for use in aluminum holding and refining operations. Positioned above said heating portion 18 is insulated portion 19 of the heating element assembly, said insulated position 19 being illustrated in the convenient form of rings of insulated material, one positioned above the other, extending to the upper position of the heating element assembly. Opening means 20 are provided in said insulated portion 19 for the passage of electrical leads therethrough for connection with heating portion 18. It will be understood that said support plate 9 contains an opening therein for the convenient passage of the heating element assembly, i.e., heating portion 18 and insulated portion 19, downward therethrough into operating position within the vessel. It is desirable to include additional insulation 21 beneath support plate 9 and above graphite block 3, and to include such insulation elsewhere, as under cover 17.

Heating element assembly mounting plate 22 is positioned over and is sealed to support plate 9. Electrical leads 23 and 24 extend from above heating element mounting plate 22 through opening means therein and in insulated portion 19 of the heating element assembly for connection with heating portion 18 of said assembly. Electrical leads 23 and 24 are sealed by suitable sealing means 25, so that air from the atmosphere will not pass through the annular space between the opening means in the mounting plate and the electrical leads positioned therein for passage through such space within insulated portion 19 to heating portion 18 of the heating element assembly.

For the sealing purposes of the invention, e.g. the sealing of heating assembly mounting plate 22 to support plate 9 and the sealing of said support plate 9 to shell 1, a suitable high temperature silicon sealant, such as the RTV sealant of Dow-Corning, or other such commercially available sealant composition can be used.

Figure 2:
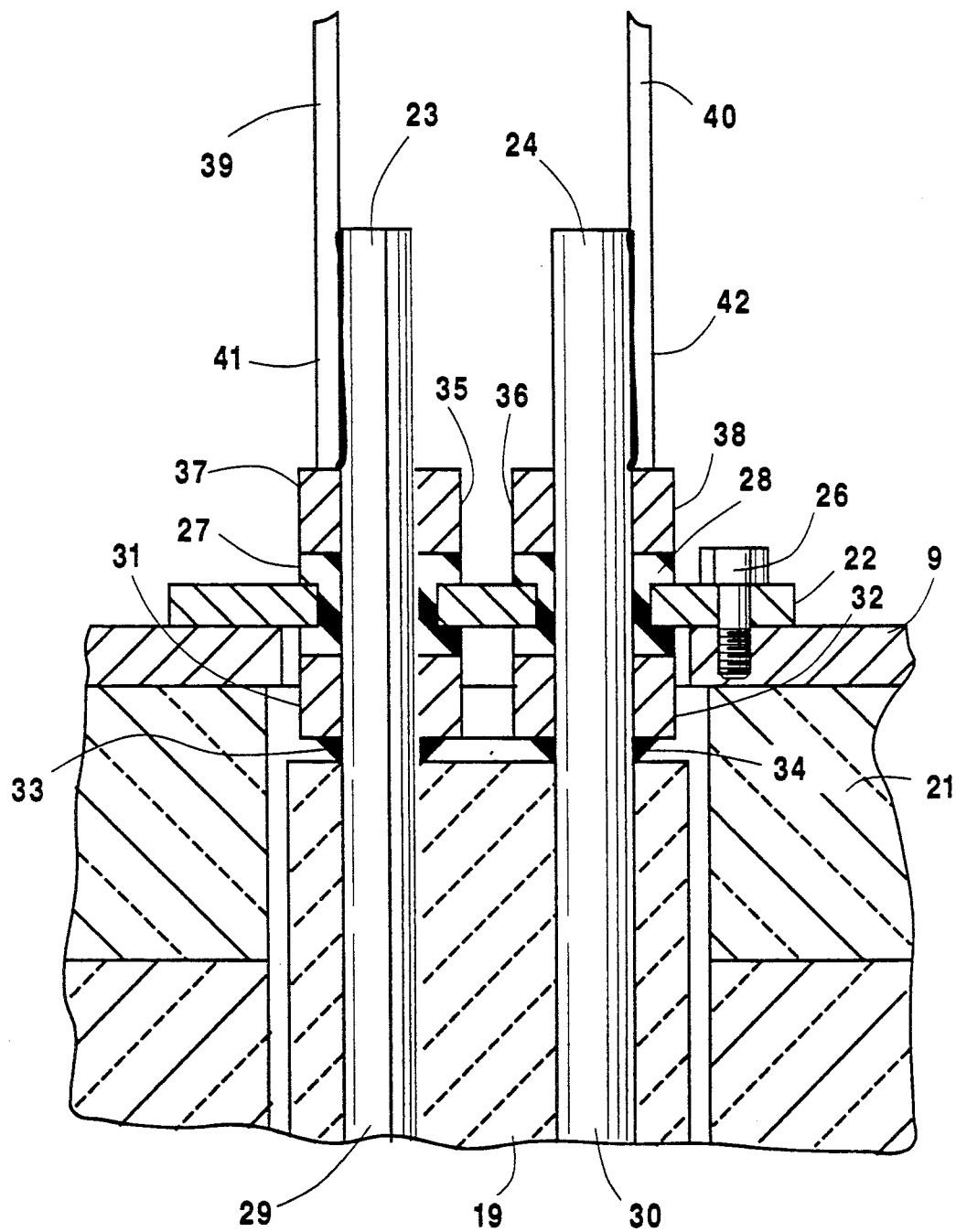
FIG. 2 is a schematic diagram in detail of a cross section of an embodiment of the apparatus of the invention.

FIG. 2 illustrate another embodiment of the sealing of the heating element assembly to the heater cover section without the use of a heater can. Refractory insulation 21 is shown with support plate 9 positioned over the uppermost area thereof. Heating element assembly mounting plate 22 is fastened and sealed to support plate 9 by bolt means 26.

The heater assembly includes round leads 23 and 24 that are adapted to extend through holes 27 and 28 in said mounting plate 22 for contact with heating portion of the heating element assembly positioned in the graphite heater block (not shown). Round leads 23 and 24 will also be seen as being adapted to extend through coaxial openings 29 and 30, respectively, in insulated portion 19 of the heating element assembly. Heater leads 23 and 24 desirably have lower metal collars 31 and 32 welded thereto by means of welds 33 and 34.

For the sealing purposes of the invention, grommets 35 and 36 of a high temperature elastomer, such as silicone rubber, are inserted into holes 27 and 28, respectively, in mounting plate 22. Round leads 23 and 24 having collars 31 and 32 welded thereto are pushed through holes in said grommets 35 and 36 until lower collars 31 and 32 have passed through said holes and are pressed against the bottom surface of said grommets. Upper collars 37 and 38 are then placed on round leads 23 and 24, respectively, above grommets 35 and 36 and, desirably, are pushed down a little so as to slightly compress the grommets. Electrical connector bars or lugs 39 and 40 are then welded in place to round leads 23 and 24, by welds 41 and 42, respectively, while said bars are positioned against the upper surface of upper collars 37 and 38.

Upon sealing the heater assembly tightly in this manner, air can be effectively prevented from entering the interior thereof below cover 9 positioned over the graphite heater block area of the assembly. Thus, no oxidation of the heating portion of the heating element assembly can occur over a period of time even if the exposure of said heating portion to chloride vapors passing though the graphite heater block causes the destruction of the normally protective oxide film on the heating elements.

It will be appreciated that the effective sealing purposes of the invention are dependent upon the availability of a material capable of sealing the elements under the operating conditions of aluminum holding and refining. The temperature in the region where the leads pass through the mounting plate was measured in a conventional vessel using the advantageous heater wire material referred to above, and with the heater system operating at full power. It was found that the operating temperature was 140° C. This is well within the maximum useful temperatures of 260° C. of existing, commercially available, low compression set silicone rubbers desirably used as the high temperature elastomers from which the sealing grommets are made.

Figure 3:
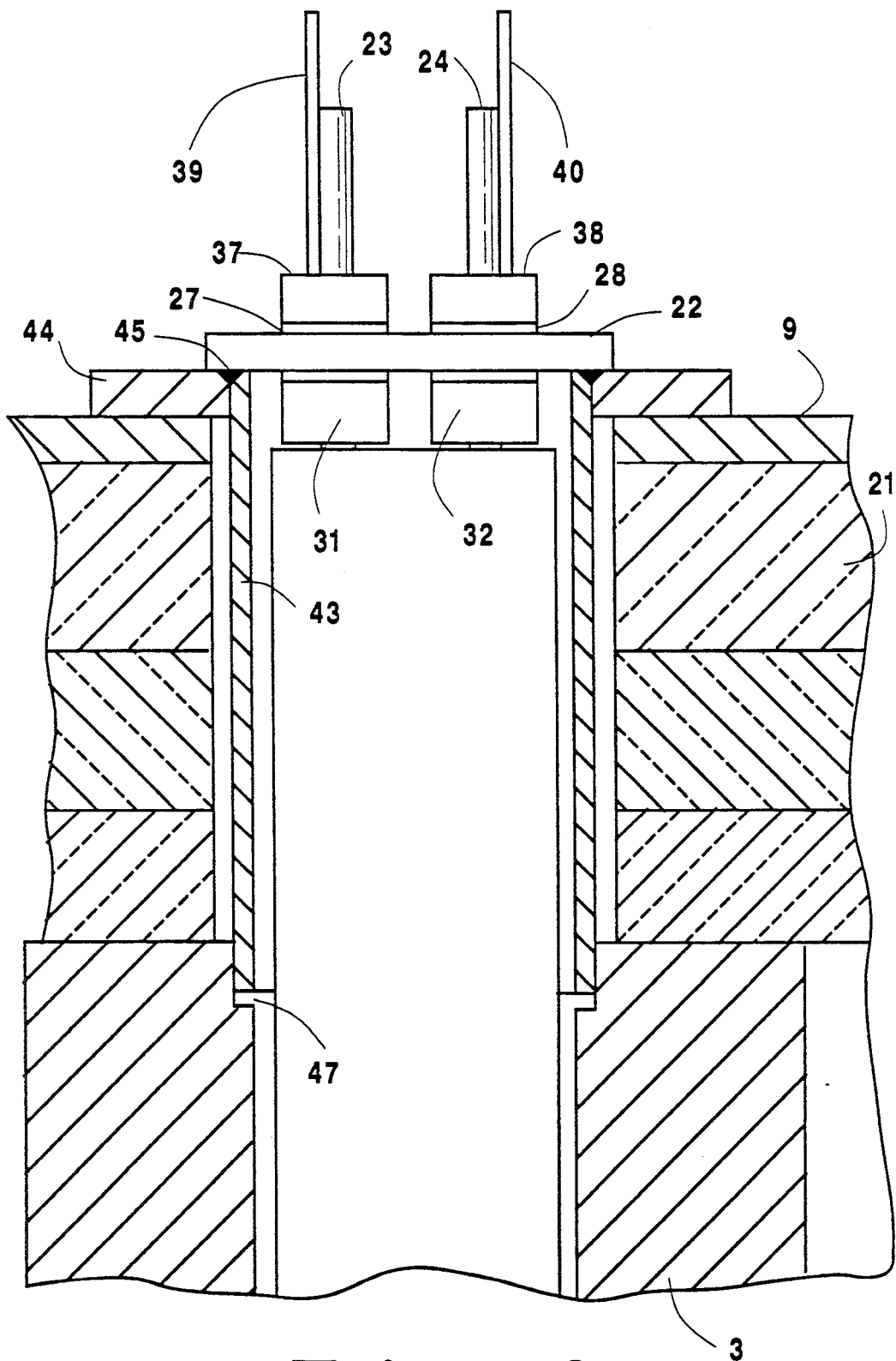
FIG. 3 is a schematic diagram in detail of a cross section of another embodiment of the apparatus of the invention.

In order to facilitate the insertion and removal of heater elements, and to prevent damage to the insulation through which the heating elements are inserted, it is desirable to provide a lead-in sleeve as illustrated in FIG. 3 of the drawings. Graphite heater block 3 with insulation 21 and support plate 9 positioned above, and heater assembly mounting plate 22 and the rest of the heater assembly are as shown in the FIG. 2 embodiment. Lead-in sleeve 43 and flange 44 welded thereto by weld 45 are fastened and sealed to support plate 9. Mounting plate 22, to which the heating element is fastened and sealed, is mounted on and sealed to flange 44. The lead-in sleeve 43 extends downward and provides an inner cover for insulation 21, desirably for the whole depth thereof. As shown in FIG. 3, lead-in sleeve 43 conveniently extends downward below the uppermost portion of graphite block 3 so as to be positioned in a niche 47 therein. Upon insertion or removal of the heater assembly from the vessel, lead-in sleeve 43 thus serves to enable said assembly to move through the insulated zone without any contact of the heating elements with the inner wall of insulation 21, so that said insulation is protected from damage during insertion or removal of heating elements during periods of service or replacement.

The elimination of the heater can in the practice of the invention has two advantages. The most obvious one is that referred to above, namely simply eliminating the relatively high cost of a heater can. An even more important advantage resides in the ability, in the practice of the invention, to use higher power heaters. With a given maximum heater wire temperature, more power can be supplied because of the elimination, as a result of the removal of said heater can, of a radiation shield between the heating element and the graphite block. Thus, only one radiant heat transfer exists, i.e. from heater to block, rather than two such radiant heat transfers, i.e., from the heat to the heater can and from the heater can to the graphite block.

It will be appreciated that if liquid chlorides were, over a period of operating time, to collect in the bottom of the heater opening in the graphite block, such chlorides would contact the heating elements and short out the elements, since said liquid chlorides are electrically conductive. Those skilled in the art will appreciate that the invention cannot be used under these circumstances. While this undesired action is unlikely to occur in most aluminum refining operations, its occurrence would be most likely in the event a considerable amount of chlorine were to be used to remove alkyli metals, particularly in long run continuous casting operations.

Those skilled in the art will appreciate that various changes and modifications can be made in the details of the invention without departing from the scope of the invention as recited in the appended claims. While a particular nickel-chromium alloy is disclosed above for desirable use as the heating element material, other nickel-based or other special high temperature alloys, including iron-based alloys, can also be employed. As indicated above, such materials form a protective oxide layer on the surface of the heating elements. While chloride vapors destroy the normally protective nature of the oxide film and thus enable very rapid oxidation to occur, the severe erosion that might otherwise occur on the heater wires when exposed to chloride vapors in the presence of air is avoided by the sealing means of the invention that prevents oxygen from reaching the heating elements and thus prevents such oxidation from occurring.

It will be appreciated that, for refining operations, the gas distribution means employed may comprise any such means known in the art and convenient for use in a given application. A rotating gas distribution means such as the use of a shaft-driven rotating rotor is commonly used for this purpose.

While any convenient materials of construction may be employed in the apparatus of the invention, it should be noted that the refractory sheet is desirably a ceramic fiber reinforced structural alumina available in sheet form convenient for use in the practice of the invention. Such a sheet material commercially available is ZIRCAR TM refractory sheet type 100, having useful properties to 2,400° F., marketed by Zircar Products, Inc. Such sheets, comprising about 75% alumina ($Al_2O_3$) 16% silica and 9% of other metal oxides, have highly desirably flexural and compressive strengths in the range of high temperature plastics, but retain strength and utility to levels far exceeding the maximum use temperatures of common plastics.

It should be noted that, when changing heating elements, air is allowed to contact the heater block and the heating elements for a brief period of time. Longer heater life can be reasonably contemplated, as by the use of lower heating element temperatures at a given power level, resulting in fewer heating element changes being required. It is not unreasonable, in the practice of the invention, to expect that there may not have to be a heating element change during the typical useful life of a refractory system for aluminum holding and refining.

The invention serves to advance the aluminum refining art. In the highly desirable use of graphite heater blocks, the invention provides for the protection of heaters placed therein in a convenient, efficient and effective manner. In so doing, the invention further enhances the highly desirable graphite heater block approach to practical commercial aluminum refining operations.

I claim:

1. In a vessel adapted for the holding, with or without refining, of molten aluminum and comprising (1) an insulated shell having bottom and side walls impervious to molten aluminum; (2) a graphite block lining on at least one interior side wall of said shell, said graphite block extending above the design operating melt level within the vessel, said graphite block being positioned so as to come into contact with the molten aluminum within the vessel, and having an opening therein extending from the upper end thereof in the direction of, but not reaching, the bottom of said block; (3) and a heating element assembly disposed within the opening in said graphite block, said heating element being supported therein without electrical contact with said graphite block, the improvement comprising:
   (a) support means attached and sealed to said shell and extending inwardly into the vessel at a position above said graphite block;
   (b) a heating element assembly mounting plate fastened and sealed to said support means, and having opening means therein for the positioning of electrical leads therethrough, without inclusion of a metal heating element container;
   (c) electrical leads adapted for connection to the heating portion of the heating element assembly, said leads extending from above said heater assembly mounting plate;
   (d) sealing means adapted to prevent the passage of air through the annular space between said electrical leads and the wall of said opening means upon positioning of electrical leads therein;
   (e) a refractory sheet positioned on the inner surface of said graphite block and extending vertically so as to protect said graphite block from contact with oxygen in the gas phase above the idle level of melt within the vessel, said refractory sheet extending horizontally substantially to both sides of the shell, the upper end of the refractory sheet being secured to said support plate, whereby oxidation of the graphite block and corrosion of the heating element by the combined action of air and chloride vapors is effectively precluded.

2. The apparatus of claim 1 in which said electrical leads comprise two separate leads and the opening means in said heating assembly mounting plate comprise separate openings for each said electrical lead.

3. The apparatus of claim 2 and including lower collar means applied to said lead means and below the heating assembly mounting plate positioned so as to contact the lower surface of said sealing means and the uppermost insulated portion of the heating element assembly, said lower collar means having opening means therein for the positioning of said leads therethrough.

4. The apparatus of claim 3 and including upper collar means positioned above the heating element assembly mounting plate so as to contact the upper surface of said sealing means, said upper collar having opening means therein for the positioning of said leads therethrough.

5. The apparatus of claim 4 and including electrical connection lugs connected to said leads above the upper collar means.

6. The apparatus of claim 5 in which said electrical connection lugs are connected in a position such as to slightly compress said sealing means.

7. The apparatus of claim 2 in which said sealing means comprise grommets of high temperature elastomer.

8. The apparatus of claim 1 in which said refractory sheet is secured at its upper end between said support means and a metal plate comprising a portion of said shell, the lower end of said refractory sheet extending below the lower design idle level of melt within the vessel.

9. The apparatus of claim 8 in which the lower end of said refractory sheet is positioned within a notch in said graphite block.

10. The apparatus of claim 1 and including insulation means positioned between said support means and the upper end of said graphite block, and including opening means therein.

11. The apparatus of claim 8 in which said support means includes an upwardly extending flange portion at the inner end thereof, said flange position and a metal plate comprising a portion of said shell being secured together with the upper end of said refractory sheet being positioned therebetween.

12. The apparatus of claim 1 and including gas distribution means for injecting gas into molten aluminum within said vessel.

13. The apparatus of claim 10 and including sleeve means positioned at the inner surface of said opening means so as to protect said insulation means upon passage of the heater assembly into or out of said opening in the graphite block.

14. The apparatus of claim 13 and including flange means for securing said sleeve means to said support means.

* * * * *